United States Patent
Chen et al.

(10) Patent No.: US 10,902,233 B2
(45) Date of Patent: Jan. 26, 2021

(54) SERVICE PROCESSING USING A DIGITAL OBJECT IDENTIFIER

(71) Applicant: Advanced New Technologies Co., Ltd., Grand Cayman (KY)

(72) Inventors: Ge Chen, Hangzhou (CN); Lingnan Shen, Hangzhou (CN); Yanghui Liu, Hangzhou (CN); Jie Qi, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

(21) Appl. No.: 16/802,725

(22) Filed: Feb. 27, 2020

(65) Prior Publication Data
US 2020/0202093 A1 Jun. 25, 2020

Related U.S. Application Data

(63) Continuation of application No. 16/434,441, filed on Jun. 7, 2019, now Pat. No. 10,607,050, which is a
(Continued)

(30) Foreign Application Priority Data
Dec. 8, 2016 (CN) .......................... 2016 1 1121881

(51) Int. Cl.
*G06F 17/00* (2019.01)
*G06K 7/14* (2006.01)
(Continued)

(52) U.S. Cl.
CPC ....... *G06K 7/1413* (2013.01); *G06K 17/0025* (2013.01); *G06Q 20/3276* (2013.01);
(Continued)

(58) Field of Classification Search
CPC ....... G06Q 30/02; G07F 7/1008; G06K 17/00
(Continued)

(56) References Cited

U.S. PATENT DOCUMENTS

| 10,607,050 B2 | 3/2020 | Chen et al. |
| 2011/0238473 A1 | 9/2011 | Sankolli et al. |

(Continued)

FOREIGN PATENT DOCUMENTS

| CN | 101847236 | 9/2010 |
| CN | 103049869 | 4/2013 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Ahshik Kim
(74) *Attorney, Agent, or Firm* — Fish & Richardson P.C.

(57) ABSTRACT

A digital object identifier (DOI) display request is received. A service type of a service corresponding to the display request is determined. Basic user information of a first user and identity type information corresponding to the service type is determined based on the service type and stored calibration information, where the identity type information is pre-authenticated to ensure validity based on a validity period associated with the identity type information. A DOI of the first user is generated based on the basic user information and the identity type information. The DOI is displayed for a second user to perform service processing based on the basic user information and the identity type information in the DOI.

18 Claims, 10 Drawing Sheets

Related U.S. Application Data continuation of application No. PCT/CN2017/113576, filed on Nov. 29, 2017.

(51) Int. Cl.
  *G06Q 20/32* (2012.01)
  *G06Q 30/02* (2012.01)
  *H04L 29/08* (2006.01)
  *G06K 17/00* (2006.01)

(52) U.S. Cl.
  CPC ..... *G06Q 20/3278* (2013.01); *G06Q 30/0207* (2013.01); *G06Q 30/0236* (2013.01); *H04L 67/146* (2013.01); *H04L 67/16* (2013.01)

(58) Field of Classification Search
  USPC .................................................. 235/75, 375
  See application file for complete search history.

(56) References Cited

U.S. PATENT DOCUMENTS

| | | |
|---|---|---|
| 2012/0160912 A1 | 6/2012 | Laracey |
| 2013/0048714 A1 | 2/2013 | Sharma et al. |
| 2013/0238455 A1 | 9/2013 | Laracey |
| 2015/0199941 A1 | 7/2015 | Reunamaki et al. |
| 2015/0205984 A1* | 7/2015 | Jiang ............... G06K 19/08 235/437 |
| 2015/0248663 A1 | 9/2015 | Meera et al. |
| 2016/0042485 A1* | 2/2016 | Kopel ............... G06Q 30/0241 705/13 |
| 2018/0039968 A1 | 2/2018 | Collinge et al. |
| 2018/0330354 A1 | 11/2018 | Xiu et al. |
| 2019/0286865 A1 | 9/2019 | Chen et al. |

FOREIGN PATENT DOCUMENTS

| | | |
|---|---|---|
| CN | 103227796 | 7/2013 |
| CN | 203338381 | 12/2013 |
| CN | 103577421 | 2/2014 |
| CN | 104021468 | 9/2014 |
| CN | 105488364 | 4/2016 |
| CN | 105590198 | 5/2016 |
| CN | 105871824 | 8/2016 |
| CN | 107016420 | 8/2017 |
| JP | 2004213362 | 7/2004 |
| JP | 2015135683 | 7/2015 |
| JP | 2017503253 | 1/2017 |
| TW | 201421393 | 6/2014 |
| TW | I522836 | 2/2016 |
| WO | WO 2016131386 | 8/2016 |
| WO | WO 2016188281 | 12/2016 |

OTHER PUBLICATIONS

Extended European Search Report in European Application No. 17878848.5, dated Nov. 15, 2019, 9 pages.

Nakamoto, "Bitcoin: A Peer-to-Peer Electronic Cash System," www.bitcoin.org, 2005, 9 pages.

PCT International Preliminary Report on Patentability in International Application No. PCT/CN2017/113576, dated Jun. 11, 2019, 10 pages (with English Translation).

PCT International Search Report and Written Opinion in International Application No. PCT/CN2017/113576, dated Mar. 6, 2018, 15 pages (with English Translation).

* cited by examiner

SERVICE PROCESSING USING A DIGITAL OBJECT IDENTIFIER

CROSS-REFERENCE TO RELATED APPLICATIONS

This application is a continuation of U.S. patent application Ser. No. 16/434,441, filed on Jun. 7, 2019, which is a continuation of PCT Application No. PCT/CN2017/113576, filed on Nov. 29, 2017, which claims priority to Chinese Patent Application No. 201611121881.8, filed on Dec. 8, 2016, and each application is hereby incorporated by reference in its entirety.

TECHNICAL FIELD

The present application relates to the field of computer technologies, and in particular, to a method and an apparatus for processing a service.

BACKGROUND

As information technologies develop, digital object identifiers (DOI) such as bar codes generated by using digital resource identification technologies are widely used in various services, for example, code scanning payment, contact adding, and following. The DOI is a coding pattern formed by distributing specific geometric patterns (for example, a long strip shape and a square) according to a specific rule, and includes a one-dimensional bar code, a two-dimensional code, etc.

The DOI is graphically displayed after a plurality of pieces of "invisible" information such as link information, a user identifier, and product information are coded. Therefore, a user can use a corresponding device to scan and identify the DOI to obtain information included in the DOI, thereby performing a corresponding service operation.

In the existing technology, a method for completing a service operation by using a DOI is usually as follows: A first user displays a DOI (for example, a two-dimensional code) of the first user by using a first terminal device, and the DOI stores a user ID of the first user; and a second user can scan the DOI of the first user by using a second terminal device (for example, a code scanning device), and complete corresponding service processing based on the user ID after obtaining the user ID of the first user.

However, in a process of completing a service by using a DOI, different from short-range communications technologies such as Near Field Communication (NFC), two service parties cannot exchange information by using the DOI. In other words, only unidirectional one-time information transmission can be implemented by using the DOI. Especially in some service scenarios, a service provider can only know basic information (for example, a user ID or an account name) of the first user based on the DOI of the first user. To complete the service, the service provider needs to perform additional service operations. Apparently, the method is relatively cumbersome.

SUMMARY

Implementations of the present application provide a method for processing a service, so as to alleviate a problem in the existing technology that implementation of some services are excessively cumbersome in a service scenario of using a digital object identifier (DOI).

The implementations of the present application provide an apparatus for processing a service, so as to alleviate the problem in the existing technology that implementation of some services are excessively cumbersome in a service scenario of using a DOI.

The implementations of the present application use the following technical solutions.

An implementation of the present application provides a method for processing a service, including the following: receiving a DOI display request; determining a service type corresponding to the display request; obtaining basic user information of a first user and pre-authenticated identity type information corresponding to the service type based on the determined service type; and generating and displaying a DOI of the first user based on the basic user information and the identity type information so that a second user performs service processing based on the basic user information and the identity type information included in the displayed DOI.

An implementation of the present application further provides a method for processing a service, including the following: obtaining a DOI of a first user, where the DOI is generated based on basic user information of the first user and pre-authenticated identity type information of a corresponding service type; determining the basic user information included in the DOI and the identity type information of the first user additionally included in the DOI; and performing service processing based on the basic user information and the identity type information.

An implementation of the present application provides an apparatus for processing a service, including the following: a receiving module, configured to receive a DOI display request; a determining module, configured to determine a service type corresponding to the display request; an acquisition module, configured to obtain basic user information of a first user and pre-authenticated identity type information corresponding to the service type based on the determined service type; and a generation module, configured to generate and display a DOI of the first user based on the basic user information and the identity type information so that a second user performs service processing based on the basic user information and the identity type information included in the displayed DOI.

An implementation of the present application provides another apparatus for processing a service, including the following: an acquisition module, configured to obtain a DOI of a first user, where the DOI is generated based on basic user information of the first user and pre-authenticated identity type information of a corresponding service type; a determining module, configured to determine the basic user information included in the DOI and the identity type information of the first user additionally included in the DOI; and a processing module, configured to perform service processing based on the basic user information and the identity type information.

At least one of the previously described technical solutions used in the implementations of the present application can achieve the following beneficial effects:

In a scenario of obtaining a business service by using the DOI, when the first terminal device generates the DOI of the first user needed by the service, the basic user information of the first user and the identity type information of the first user that is applicable to the service type are obtained based on the service type, and the DOI of the first user is generated based on the basic user information and the identity type information. As such, after obtaining the DOI of the first user through code scanning, etc., the service provider can obtain, from the DOI, the identity type information of the requesting party included in the DOI to provide a corresponding business service based on the identity type information. Therefore, the requesting party can fully obtain the business service provided by the service provider.

Compared with the method in the existing technology, in the implementations of the present application, the identity type information of the requesting party is added to the DOI so that the service provider can obtain the DOI of the requesting party together with the identity type information of the requesting party, thereby effectively reducing or preventing corresponding operations additionally performed by the service provider, further improving service providing efficiency, and ensuring service benefits obtained by the requesting party.

BRIEF DESCRIPTION OF DRAWINGS

The accompanying drawings described here are used to provide further understanding of the present application, and constitute a part of the present application. Schematic implementations of the present application and descriptions of the implementations are used to explain the present application, and do not constitute an improper limitation to the present application. In the accompanying drawings.

DESCRIPTION OF IMPLEMENTATIONS

As described above, when a service is processed by using a digital object identifier (DOI), a first user displays the DOI by using a first device, and a second user can obtain, through code scanning by using a second device, the DOI displayed by the first device. Different from a plurality of times of information exchange in an existing short-range transmission technology, the second device does not feed the DOI back to the first device in a code scanning process. In other words, the code scanning process can be considered as a unidirectional information transmission process actually. In addition, information included in a generated DOI is fixed, and information obtained when the second device performs a code scanning operation is the information included in the DOI. A new DOI needs to be generated to obtain other information. It can be seen that DOI scanning is a unidirectional one-time information transmission process.

To make the objectives, technical solutions, and advantages of the present application clearer, the following clearly and comprehensively describes the technical solutions of the present application with reference to specific implementations and corresponding accompanying drawings in the present application. The described implementations are some but not all of the implementations of the present application. All other implementations obtained by a person of ordinary skill in the art based on the implementations of the present application without creative efforts shall fall within the protection scope of the present application.

Figure 1A:
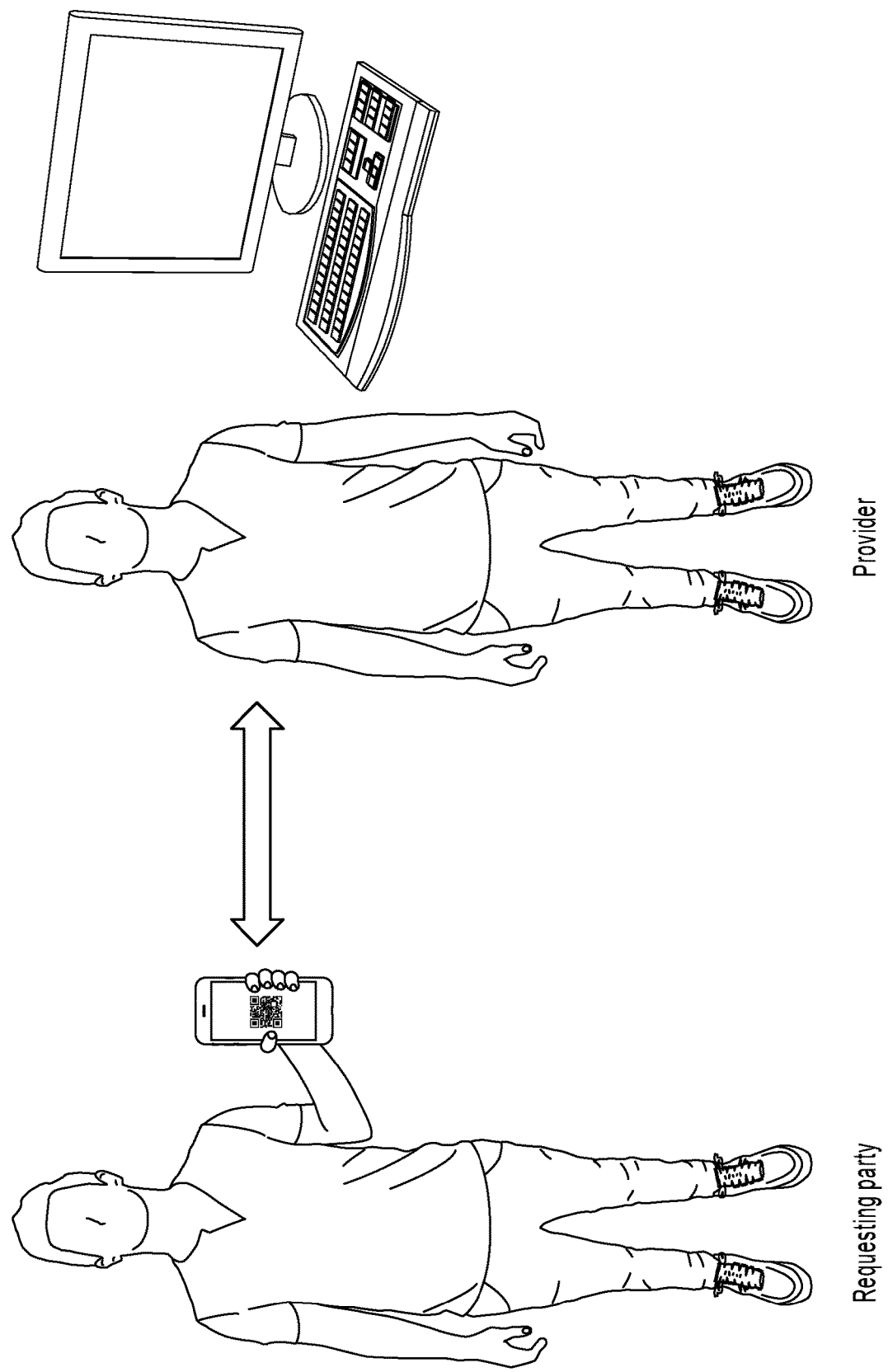
FIG. 1a is a schematic diagram illustrating an architecture that a service processing process is based on, according to an implementation of the present application.

It is worthwhile to note that, in an implementation of the present application, a service processing process can be based on an architecture shown in FIG. 1a. A first user can display a DOI of the first user by using a terminal device (namely, a first terminal device) of the first user so that a second user can obtain the DOI through code scanning, screenshot, etc. by using a corresponding terminal device (namely, a second terminal device, such as a code scanning device).

The first terminal device includes but is not limited to a terminal device having a display screen, such as a smartphone, a smartwatch, a tablet computer, or a computer. The second terminal device includes but is not limited to a terminal device having a code scanning function, such as a smartphone, a smartwatch, a tablet computer, a computer, a code scanner, a POS machine, a ticket vending machine, or a vending machine, which constitutes no limitation to the present application here.

Figure 1B:
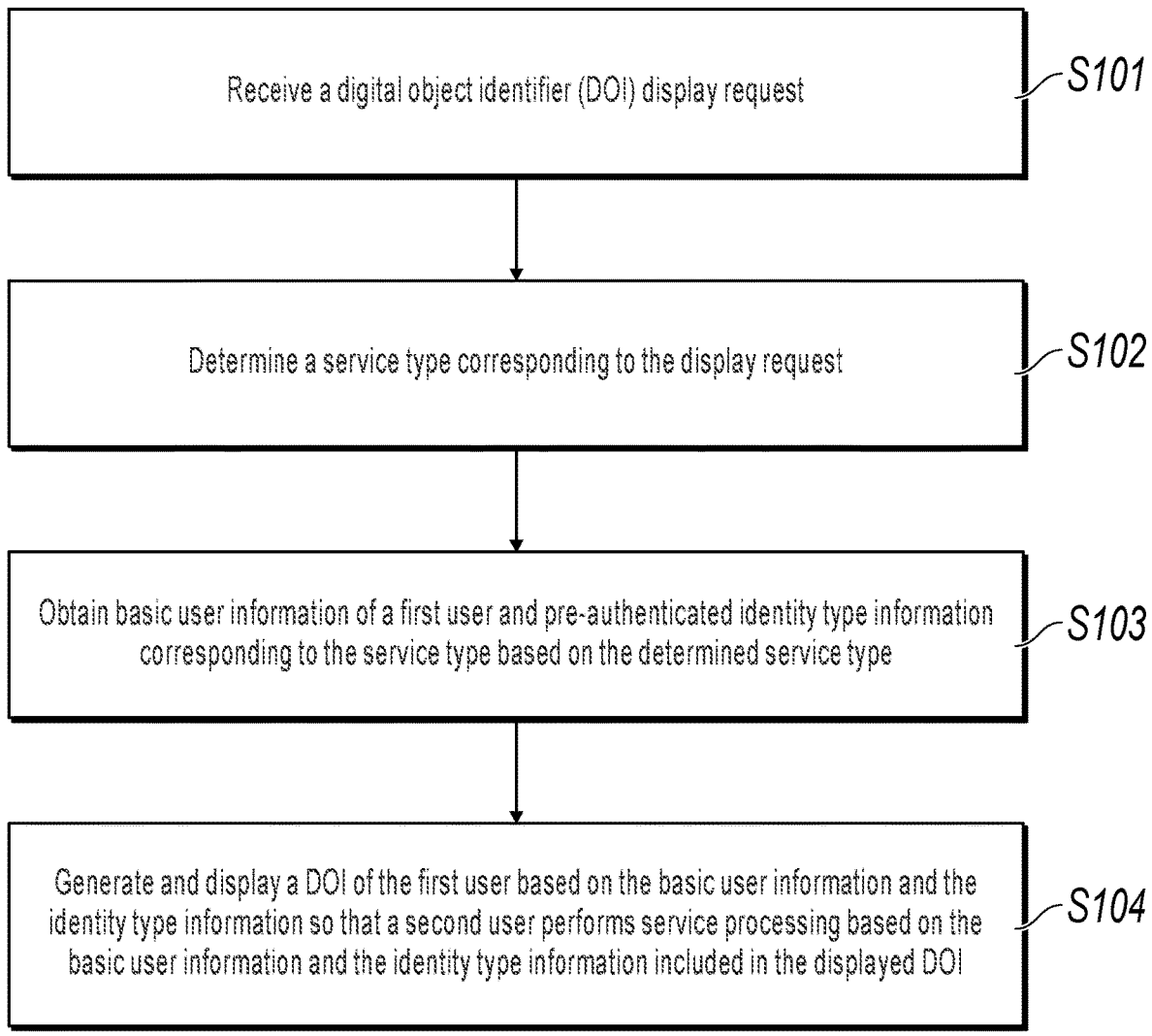
FIG. 1b is a schematic diagram illustrating a service processing process, according to an implementation of the present application.

Based on the architecture shown in FIG. 1a, an implementation of the present application provides a service processing process shown in FIG. 1b. The process includes the following steps.

S101. Receive a DOI display request.

In actual services, a user can operate a first terminal device to display the DOI. Therefore, the first terminal device can receive a display request sent by the first user.

In actual operations, the first terminal device has a DOI display function (the function can be provided by an operating system of the first terminal device, or can be provided by an application installed in the first terminal device, which is not limited here) so that the first user can send the display request in a corresponding function interface.

S102. Determine a service type corresponding to the display request.

In the present implementation of the present application, if the first user needs to obtain different types of services, the first user can use the first terminal device to generate DOIs applicable to the different types of services. In other words, the display request sent by the user actually includes information about different service types. Therefore, after receiving the display request, a second terminal device of a second user further determines the service type corresponding to the display request.

S103. Obtain basic user information of a first user and pre-authenticated identity type information corresponding to the service type based on the determined service type.

In the present implementation of the present application, it can be understood that the basic user information is a user ID, an account name, etc. of the first user, and the identity type information is identity-related information of the first user that represents an occupation type, an account type, etc. of the first user.

In actual applications, for different service types, the identity type information can affect a business service obtained by the first user. For example, in shopping payment transactions, membership of the first user can enable the first user to enjoy a corresponding discount. For another example, in subway ticket payment transactions through code scanning, a student identity of the first user can enable the first user to enjoy a corresponding discount.

Therefore, the first terminal device obtains the identity type information of the user based on the corresponding service type in a DOI generation process. To ensure validity of the identity type information of the first user, the identity type information is pre-authenticated in the present implementation of the present application.

In the present implementation of the present application, the identity type information of the first user is included in the DOI of the first user. Compared with the existing technology, especially when information is transmitted by using the DOI, the DOI that includes the identity type information can enable the second user to obtain an identity type of the first user in a unidirectional one-way code scanning transmission process without a need of performing an additional information transmission operation.

S104. Generate and display a DOI of the first user based on the basic user information and the identity type information so that a second user performs service processing based on the basic user information and the identity type information included in the displayed DOI.

With reference to the previous step, it can be seen that the DOI generated in the present step can be considered as a DOI applicable to a corresponding service type. In other words, after obtaining the DOI of the first user by using the second device, the second user can perform service processing based on the identity type information included in the DOI so that the first user obtains the corresponding service.

According to the previous steps, in a scenario of obtaining a business service by using a DOI, when the first terminal device generates the DOI of the first user needed by the service, the basic user information of the first user and the identity type information of the first user that is applicable to the service type are obtained based on the service type, and the DOI of the first user is generated based on the basic user information and the identity type information. As such, after obtaining the DOI of the first user through code scanning, etc., the service provider can obtain, from the DOI, the identity type information of the requesting party included in the DOI to provide a corresponding business service based on the identity type information. Therefore, the requesting party can fully obtain the business service provided by the service provider.

Figure 2:
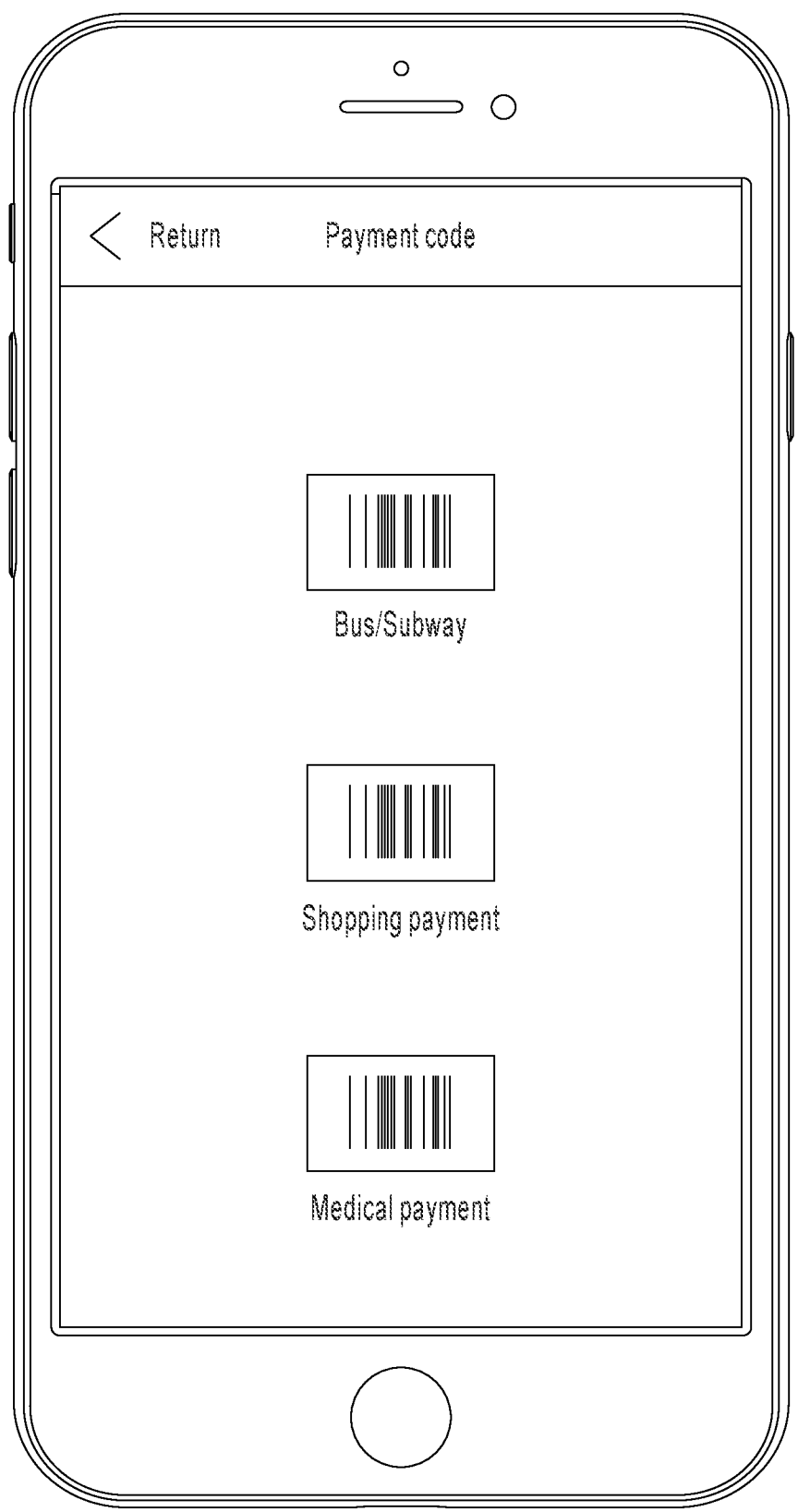
FIG. 2 is a schematic diagram illustrating an interface where a user sends a display request, according to an implementation of the present application.

For the described process, in actual applications, FIG. 2 shows payment code generation controls of three types of services. The user can select a payment code control applicable to a corresponding service in a payment code interface of a mobile phone. Correspondingly, after the user taps a certain payment code, it is equivalent to sending a display request, and the mobile phone can determine a corresponding service type from the display request. As such, the mobile phone can obtain corresponding identity type information.

In the present implementation of the present application, the identity type information is pre-authenticated, and pre-authenticating the identity type information includes: receiving identity type information to be checked that is entered by the first user; and sending the identity type information to be checked to a server having a verification function for authentication.

In a possible method, the first user can enter information such as identity card information, health insurance card information, or student ID card information in the first terminal device as the identity type information to be checked. Correspondingly, the first terminal device can send the identity type information to be checked that is entered by the user to a service platform server so that the service platform server checks the identity type information to be checked, and feeds back a check result to the first terminal device. A process of checking the identity type information to be checked constitutes no limitation to the present application.

The generating a DOI of the first user based on the basic user information and the identity type information includes: setting an information flag bit for the identity type information; and generating the DOI of the first user based on the basic user information and the identity type information that has the information flag bit.

Figure 3:
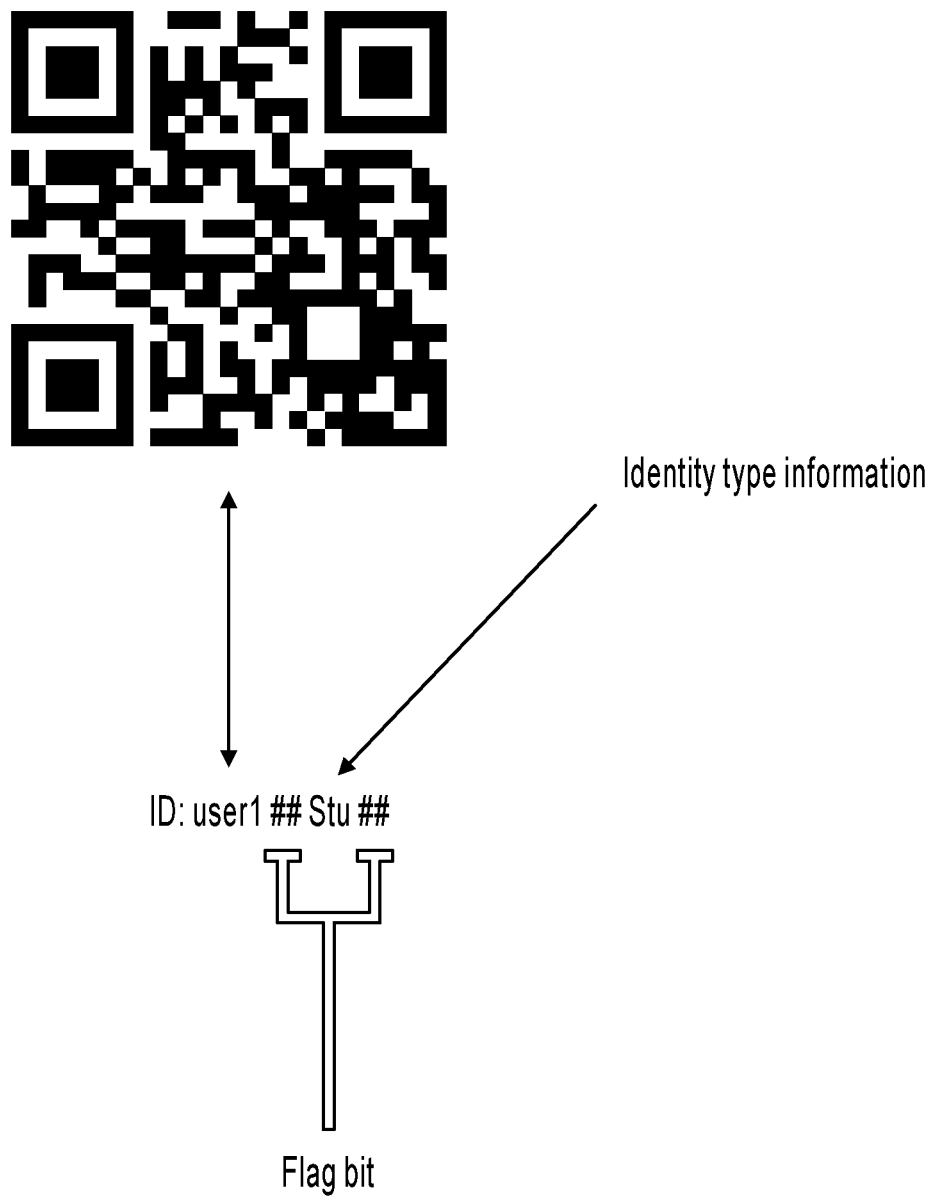
FIG. 3 is a schematic diagram illustrating information included in a digital object identifier (DOI), according to an implementation of the present application.

For example, in subway ticket payment transactions through code scanning, if a certain user is a student, a mobile phone used by the user can obtain a user ID and identity type information of the user. Assume that the identity type information is a user identity "Stu" (indicates the student) in the present example. As shown in FIG. 3, the identity type information uses "##" as a flag bit before a two-dimensional code is generated. In other words, in FIG. 3, a character string between "##" is a character string corresponding to the identity type information, namely "Stu".

Figure 4:
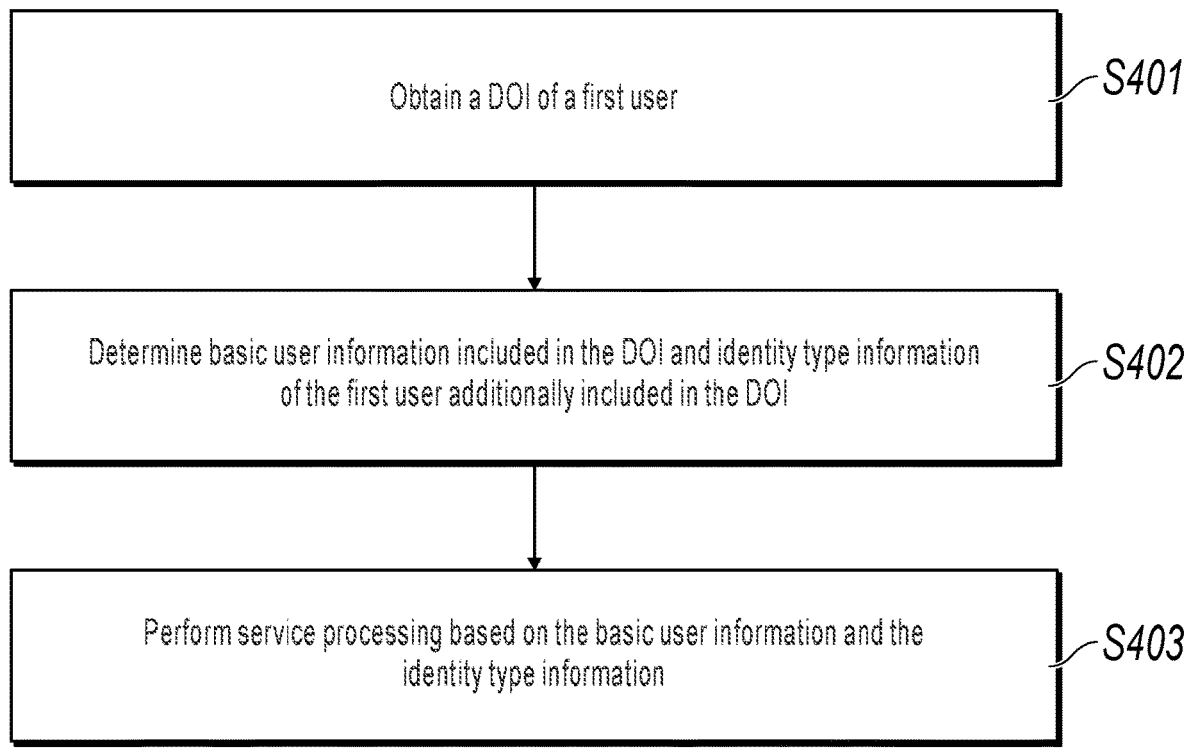
FIG. 4 is a schematic diagram illustrating a service processing process on a second user side, according to an implementation of the present application.

The previous content is described based on a first user side. For a second user side, an implementation of the present application further provides a method for processing a service. As shown in FIG. 4, the method includes the following steps.

S401. Obtain a DOI of a first user.

The DOI is generated based on basic user information of the first user and pre-authenticated identity type information of a corresponding service type.

In the present implementation of the present application, the DOI of the first user can be displayed by a first terminal device used by the first user. After the first terminal device displays the DOI, a second terminal device (for example, a code scanning device) can obtain the DOI of the first user through code scanning, screenshot, etc., which constitutes no limitation to the present application.

S402. Determine basic user information included in the DOI and identity type information of the first user additionally included in the DOI.

In the present implementation of the present application, the identity type information of the first user is included in the DOI of the first user. Compared with the existing technology, especially when information is transmitted by using the DOI, the DOI that includes the identity type information can enable a service provider to obtain an identity type of the first user in a one-way code scanning transmission process without a need of performing an additional information transmission operation.

In actual operation, the second user can parse the DOI after obtaining the DOI of the first user by using the second terminal device, so as to obtain the identity type information of the first user, which constitutes no limitation to the present application.

S403. Perform service processing based on the basic user information and the identity type information.

In actual applications, after obtaining the identity type information of the first user, the second user can perform service processing based on the identity type information of the first user.

For example, in code scanning payment transactions on a bus, a passenger can display a two-dimensional code by using a mobile phone, and scan the two-dimensional code by using a code scanning device on the bus. After obtaining the two-dimensional code, the code scanning device can determine that the passenger is a student. Therefore, deduction can be completed after a corresponding discount is made.

According to the previous steps, in a scenario of obtaining a business service by using a DOI, the first user adds corresponding identity type information to the generated DOI of the first user. As such, after obtaining the DOI of the first user through code scanning, etc., the service provider can obtain, from the DOI, the identity type information of the requesting party included in the DOI to provide a corresponding business service based on the identity type information. Therefore, the requesting party can fully obtain the business service provided by the service provider.

Compared with the method in the existing technology, in the present implementation of the present application, the identity type information of the requesting party is added to the DOI so that the service provider can obtain the DOI of the requesting party together with the identity type information of the requesting party, thereby effectively reducing or preventing corresponding operations additionally performed by the service provider, further improving service providing efficiency, and ensuring service benefits obtained by the requesting party.

It is worthwhile to note that, in actual applications, the previous steps can be performed by a terminal device (namely, the second terminal device. The second terminal device can be understood as a code scanning device in the following content in the present implementation of the present application) used by the service provider.

In actual applications, after obtaining the DOI of the first user through code scanning, the code scanning device can parse the DOI and obtain information included in the parsed DOI. Therefore, in the present implementation of the present application, the determining the identity type information of the first user included in the DOI includes: parsing the DOI to obtain DOI information; obtaining information in a pre-agreed identity type flag bit in the DOI information; and determining the obtained information as the identity type information of the first user.

A two-dimensional code is used as an example. After the two-dimensional code is decoded, a corresponding character string can be obtained, for example, a uniform resource locator (URL) or another code character string. In code scanning payment transactions in the present implementation of the present application, the two-dimensional code used by the first user not only includes an ID of the user, but also includes the identity type information of the user. It is worthwhile to note that, to determine the identity type information from the character string obtained through parsing, a flag bit of the identity type information can be pre-agreed between the first user and the second user.

The example shown in FIG. 3 is still used. The code scanning device obtains a character string in the figure after decoding a two-dimensional code of a certain first user, and the character string includes a user ID of the first user. In addition, the identity type information uses "##" as a flag bit based on a predetermined agreement. In other words, in FIG. 3, a character string between "##" is a character string corresponding to the identity type information, namely "Stu".

It should be understood that the described example is merely used to describe an identity type information parsing process in the present implementation of the present application, and is not limited to the method shown in the described example in actual applications.

In the present implementation of the present application, the DOI can be parsed by using a corresponding decoder or algorithm, for example, a UTF-8 codec or a Unicode codec, which constitutes no limitation to the present application.

In actual applications, after obtaining identity information of the first user, the code scanning device can further check the identity type information to determine validity of the obtained identity type information. In other words, in the present implementation of the present application, before the performing service processing based on the identity type information, the method further includes: checking the identity type information, and determining that the identity type information matches a type of the service to be processed.

In addition, during checking in the present implementation of the present application, the code scanning device can further store calibration information, and the calibration information can include information such as a standard identity type and validity periods of different identity types. Therefore, the code scanning device can check, according to the stored standard identity type information, the identity type information parsed from the two-dimensional code.

For example, after knowing the character string "Stu" is corresponding to the identity type information, the code scanning device determines, based on the stored standard identity type, whether the character string "Stu" matches the standard identity type, and the code scanning device can further determine whether an age of the first user meets a "student" identity.

Likewise, the present example is merely intended to describe the described check process, and should not be construed as a limitation to the present application. In actual applications, another check method can be used. Details are omitted here for simplicity.

After the check succeeds, a corresponding service operation can be performed based on the identity type information of the first user. In other words, the performing service processing based on the identity type information includes: determining, according to a predetermined service processing rule, a service processing method that matches the identity type information, and performing service processing based on the determined service processing method.

In the present implementation of the present application, the service processing rule can include processing rules applicable to different service scenarios. For example, in code scanning payment transactions in a shopping process, a payment rule is providing a corresponding discount based on a member type of a consumer. Alternatively, in subway ticket payment transactions through code scanning, a payment rule is a payment reduction rule for passengers of different identities, such as students, the aged, or soldiers. In the present implementation of the present application, the service processing rule is not limited.

Therefore, with reference to the identity type information of the first user obtained by using the described process and according to the described service processing rule, corresponding service processing can be performed to provide a business service for the first user.

Especially in code scanning payment transactions, the DOI includes a two-dimensional payment code. The performing service processing based on the basic user information and the identity type information includes: determining, according to the predetermined service processing rule, a payment discount coefficient that matches the identity type information; and performing payment and deduction based on the determined payment discount coefficient and the basic user information.

It is worthwhile to note here that, it can be seen from the described content and the architecture shown in FIG. 1a that the method for processing a service in the present implementation of the present application is applicable to an offline scenario. In other words, both the first terminal device and the second terminal device can be in an offline state, thereby improving code scanning payment applicability.

The method for processing a service in the present application is also applicable to an online scenario. For the scenario, an architecture can be shown in FIG. 5a. It can be seen from FIG. 5a that two parties that need to perform service interaction can complete corresponding service operations by using an online service platform (for example, a website). Both the first user (namely, the requesting party) and the second user (the provider) register corresponding accounts on the service platform so that the service platform can uniformly specify a standard identity type information format for each user on the service platform. In addition, the service platform can determine the identity type information of the user based on personal information and historical service information of the user. For example, the service platform can determine, through review based on identity information provided by the user, that the user is a student. For another example, the service platform determines, based on historical service data of the user, that an account type of the user is a senior member.

Figure 5A:
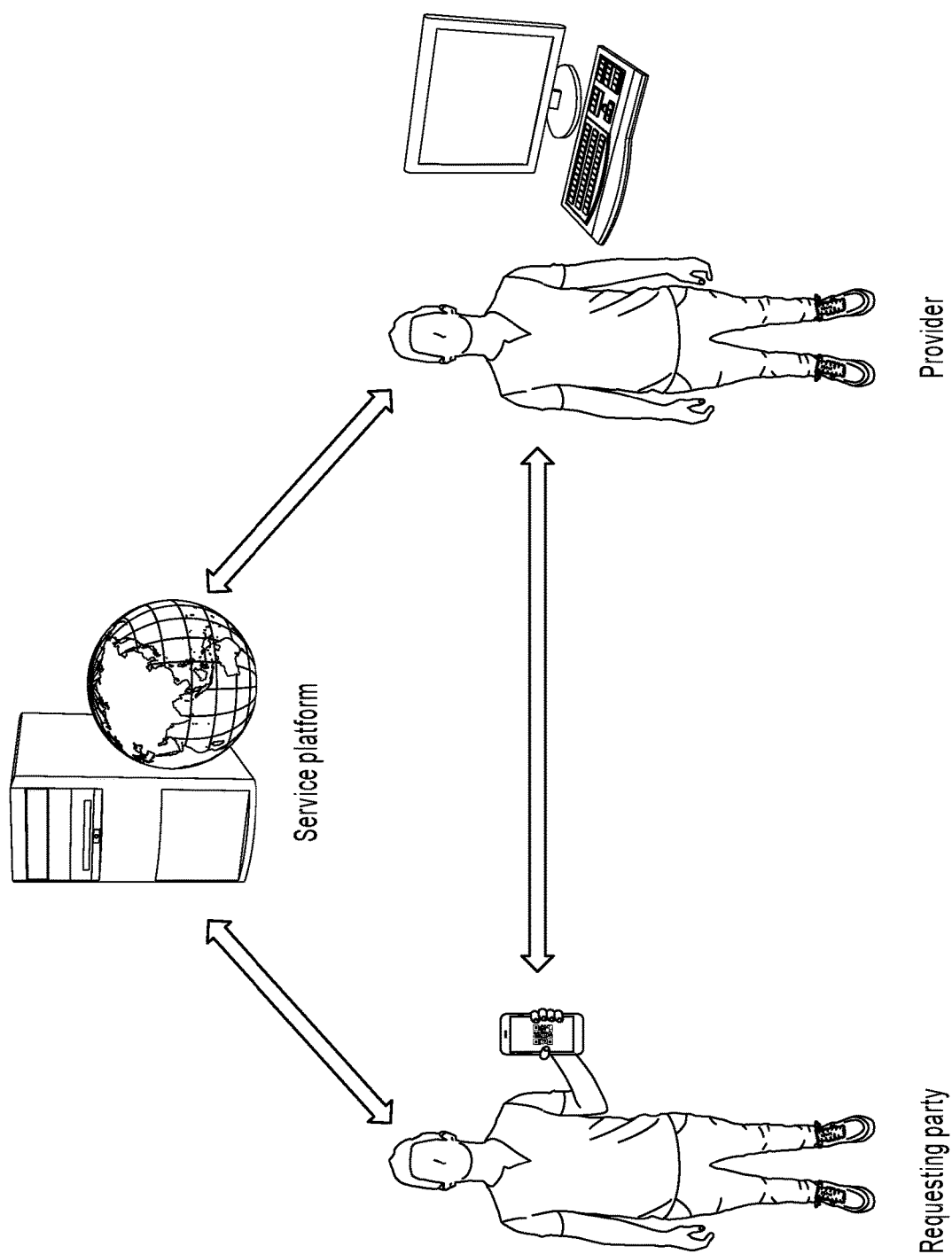
FIG. 5a is a schematic diagram illustrating an architecture in an online payment scenario, according to an implementation of the present application.
Figure 5B:
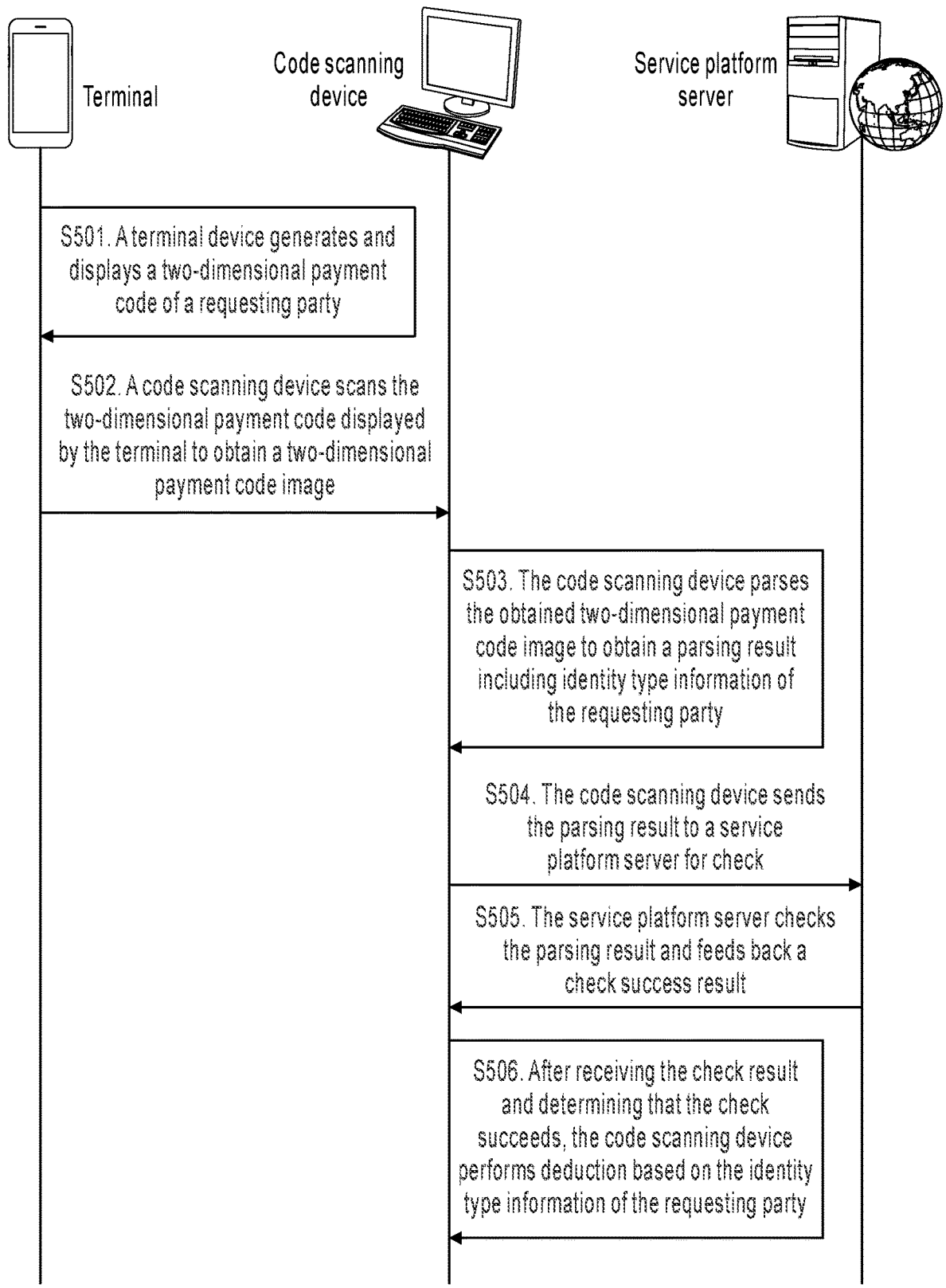
FIG. 5b is a schematic diagram illustrating a service procedure in an online code scanning payment scenario, according to an implementation of the present application.

Based on the online scenario shown in FIG. 5a, FIG. 5b can show a process of completing a payment service by two service parties. The process includes the following steps:

S501. A terminal device generates and displays a two-dimensional payment code of a requesting party.

S502. A code scanning device scans the two-dimensional payment code displayed by the terminal to obtain a two-dimensional payment code image.

S503. The code scanning device parses the obtained two-dimensional payment code image to obtain a parsing result including identity type information of the requesting party.

S504. The code scanning device sends the parsing result to a service platform server for check.

S505. The service platform server checks the parsing result and feeds back a check success result.

S506. After receiving the check result and determining that the check succeeds, the code scanning device performs deduction based on the identity type information of the requesting party.

The method for processing a service is provided in the implementation of the present application above. Based on the same idea, an implementation of the present application further provides an apparatus for processing a service.

Figure 6:
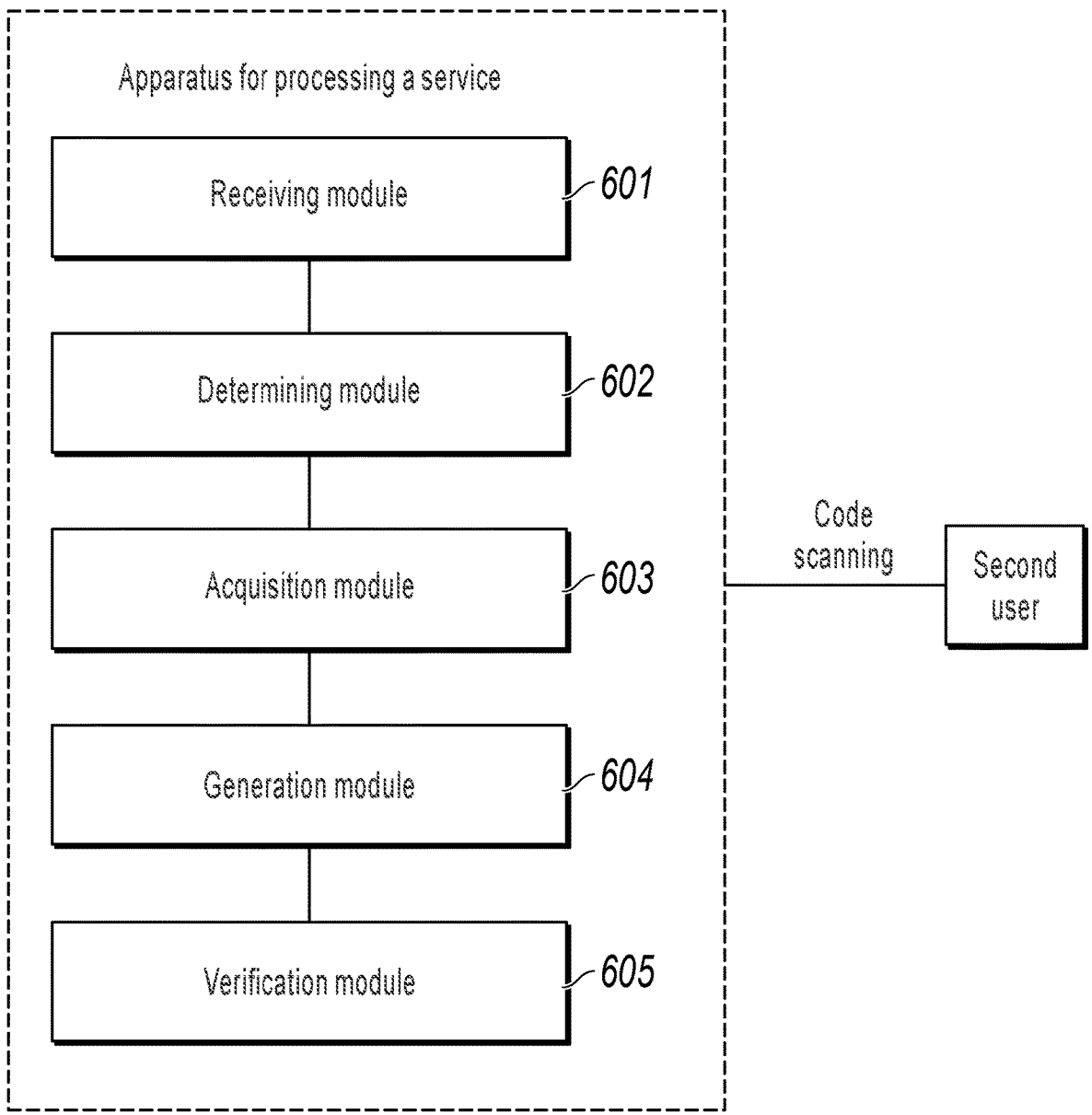
FIG. 6 is a schematic structural diagram illustrating an apparatus for processing a service on a first user side, according to an implementation of the present application.

As shown in FIG. 6, the apparatus includes the following: a receiving module 601, configured to receive a DOI display request; a determining module 602, configured to determine a service type corresponding to the display request; an acquisition module 603, configured to obtain basic user information of a first user and pre-authenticated identity type information corresponding to the service type based on the determined service type; and a generation module 604, configured to generate and display a DOI of the first user based on the basic user information and the identity type information so that a second user performs service processing based on the basic user information and the identity type information included in the displayed DOI.

The apparatus further includes a verification module 605, configured to receive identity type information to be checked that is entered by the first user; and send the identity type information to be checked to a server having a verification function for authentication.

The generation module 604 sets an information flag bit for the identity type information; and generates the DOI of the first user based on the basic user information and the identity type information that has the information flag bit.

Figure 7:
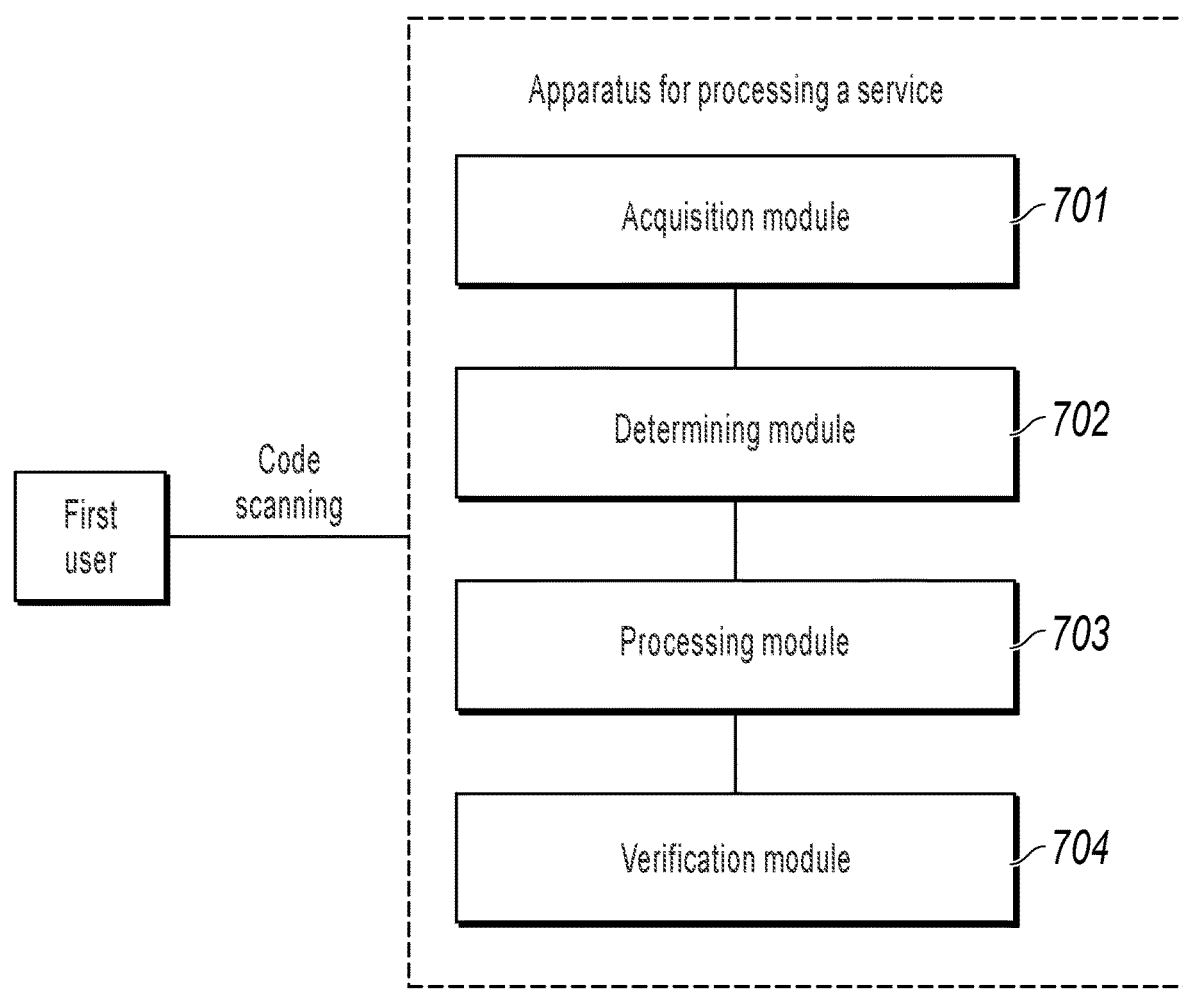
FIG. 7 is a schematic structural diagram illustrating an apparatus for processing a service on a second user side, according to an implementation of the present application.

On a second user side, an implementation of the present application further provides an apparatus for processing a service. As shown in FIG. 7, the apparatus includes the following: an acquisition module 701, configured to obtain a DOI of a first user, where the DOI is generated based on basic user information of the first user and pre-authenticated identity type information of a corresponding service type; a determining module 702, configured to determine the basic user information included in the DOI and the identity type information of the first user additionally included in the DOI; and a processing module 703, configured to perform service processing based on the basic user information and the identity type information.

Further, the determining module 702 parses the DOI to obtain DOI information; obtains information corresponding to a pre-agreed identity type flag bit in the DOI information; and determines the obtained information as the identity type information of the first user.

The apparatus further includes a verification module 704, configured to check the identity type information, and determine that the identity type information matches a type of the service to be processed.

The processing module 703 determines, according to a predetermined service processing rule, a service processing method that matches the identity type information; and performs service processing based on the determined service processing method and the basic user information.

In code scanning payment transactions, the DOI includes a two-dimensional payment code; and the processing module 703 determines, according to the predetermined service processing rule, a payment discount coefficient that matches the identity type information; and performs payment and deduction based on the determined payment discount coefficient and the basic user information.

In the 1990s, improvement of a technology can be clearly distinguished between hardware improvement (for example, improvement on a circuit structure such as a diode, a transistor, or a switch) and software improvement (improvement on a method procedure). However, with the development of technologies, improvement of many method procedures can be considered as direct improvement of a hardware circuit structure. Designers almost all program an improved method procedure to a hardware circuit, to obtain a corresponding hardware circuit structure. Therefore, it cannot be said that improvement of a method procedure cannot be implemented by using a hardware entity module. For example, a programmable logic device (PLD) (for example, a field programmable gate array (FPGA)) is such an integrated circuit. A logical function of the programmable logic device is determined by component programming executed by a user. The designers perform voluntary programming to "integrate" a digital system into a single PLD without needing a chip manufacturer to design and produce a dedicated integrated circuit chip. In addition, currently, instead of manually producing an integrated circuit chip, the programming is mostly implemented by "logic compiler" software, which is similar to a software compiler used during program development. Original code before compiling is also written in a specific programming language, which is referred to as a hardware description language (HDL), and there is more than one type of HDL, such as an ABEL (Advanced Boolean Expression Language), an AHDL (Altera Hardware Description Language), Confluence, a CUPL (Cornell University Programming Language), an HDCal, a JHDL (Java Hardware Description Language), a Lava, a Lola, a MyHDL, a PALASM, and an RHDL (Ruby Hardware Description Language), etc. Currently, a VHDL (Very-High-Speed Integrated Circuit Hardware Description Language) and Verilog are most commonly used. A person skilled in the art should also understand that a method procedure only needs to be logically programmed, and programmed to the integrated circuit by using the previous hardware description languages, so that a hardware circuit that implements the logical method procedure can be easily obtained.

A controller can be implemented by using any appropriate method. For example, the controller can be a microprocessor or a processor, or a computer-readable medium, a logic gate, a switch, an application-specific integrated circuit (ASIC), a programmable logic controller, or an embedded microprocessor that stores computer readable program code (such as software or firmware) that can be executed by the microprocessor or the processor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that a controller can be implemented by using pure computer-readable program code, and the steps in the method can be logically programmed to enable the controller to further implement same functions in forms of a logic gate, a switch, an application-specific integrated circuit, a programmable logic controller, an embedded microcontroller, etc. Therefore, the controller can be considered as a hardware component, and an apparatus that is included in the controller and that is configured to implement various functions can also be considered as a structure in the hardware component. Alternatively, an apparatus configured to implement various functions can be considered as both a software module for implementing the method and a structure in the hardware component.

The system, apparatus, module, or unit described in the described implementations can be implemented by a computer chip or an entity, or implemented by a product with a certain function. A typical implementation device is a computer. The computer can be, for example, a personal computer, a laptop computer, a cellular phone, a camera phone, a smartphone, a personal digital assistant, a media player, a navigation device, an email device, a game console, a tablet computer, or a wearable device, or a combination of any of these devices.

For ease of description, the described apparatus is described by dividing functions into various units. When the present application is implemented, the functions of the units can be implemented in one or more pieces of software and/or hardware.

A person skilled in the art should understand that the implementations of the present disclosure can be provided as a method, a system, or a computer program product. Therefore, the present disclosure can use a form of hardware only implementations, software only implementations, or implementations with a combination of software and hardware. In addition, the present disclosure can use a form of a computer program product that is implemented on one or more computer-usable storage media (including but not limited to a disk memory, a CD-ROM, and an optical memory) that include computer-usable program code.

The present disclosure is described with reference to the flowcharts and/or block diagrams of the method, the device (system), and the computer program product according to the implementations of the present disclosure. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of any other programmable data processing device to generate a machine so that the instructions executed by a computer or a processor of any other programmable data processing device generate an apparatus for implementing a specific function in one or more processes in the flowcharts or in one or more blocks in the block diagrams.

These computer program instructions can be stored in a computer readable memory that can instruct the computer or any other programmable data processing device to work in a specific method so that the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded to a computer or another programmable data processing device so that a series of operations and steps are performed on the computer or the other programmable device, thereby generating computer-implemented processing. Therefore, the instructions executed on the computer or the other programmable device provide steps for implementing a specific function in one or more processes in the flowcharts or in one or more blocks in the block diagrams.

In a typical configuration, the computing device includes one or more processors (CPU), one or more input/output interfaces, one or more network interfaces, and one or more memories.

The memory can include a non-persistent memory, a random access memory (RAM) and/or a nonvolatile memory in a computer readable medium, for example, a read-only memory (ROM) or a flash memory (flash RAM).

The computer readable medium includes persistent, non-persistent, movable, and unmovable media that can implement information storage by using any method or technology. Information can be a computer readable instruction, a data structure, a program module, or other data. A computer storage medium includes but is not limited to a phase-change random access memory (PRAM), a static random access memory (SRAM), a dynamic random access memory (DRAM), a random access memory (RAM) of another type, a read-only memory (ROM), an electrically erasable programmable read-only memory (EEPROM), a flash memory or another memory technology, a compact disc read-only memory (CD-ROM), a digital versatile disc (DVD) or another optical storage, a magnetic tape, a magnetic disk storage, another magnetic storage device, or any other non-transmission media that can be used to store information that can be accessed by the computing device. Based on the definition in the present specification, the computer readable medium does not include transitory computer readable medium (transitory media), for example, a modulated data signal and carrier.

It is worthwhile to further note that the term "include", "contain", or their any other variant is intended to cover a non-exclusive inclusion so that a process, a method, merchandise, or a device that includes a list of elements not only includes those elements but also includes other elements which are not expressly listed, or further includes elements inherent to such process, method, merchandise, or device. An element preceded by "includes a . . . " does not, without more constraints, preclude the existence of additional identical elements in the process, method, merchandise, or device that includes the element.

A person skilled in the art should understand that the implementations of the present application can be provided as a method, a system, or a computer program product. Therefore, the present application can use a form of hardware only implementations, software only implementations, or implementations with a combination of software and hardware. In addition, the present application can use a form of a computer program product that is implemented on one or more computer-usable storage media (including but not limited to a disk memory, a CD-ROM, and an optical memory) that include computer-usable program code.

The present application can be described in the general context of computer executable instructions executed by a computer, for example, a program module. Generally, the program module includes a routine, a program, an object, a component, a data structure, etc. for executing a specific task or implementing a specific abstract data type. The present application can also be practiced in distributed computing environments. In the distributed computing environments, tasks are performed by remote processing devices connected through a communications network. In a distributed computing environment, the program module can be located in both local and remote computer storage media including storage devices.

The implementations in the present specification are all described in a progressive way. For the same or similar parts of the implementations, refer to the implementations. Each implementation focuses on a difference from other implementations. Particularly, a system implementation is basically similar to a method implementation, and therefore is described briefly. For related parts, refer to partial descriptions of the method implementation.

The previous descriptions are merely implementations of the present application, and are not intended to limit the present application. A person skilled in the art can make various modifications and changes to the present application. Any modification, equivalent replacement, improvement, etc. made within the spirit and principle of the present application shall fall within the scope of the claims of the present application.

Figure 8:
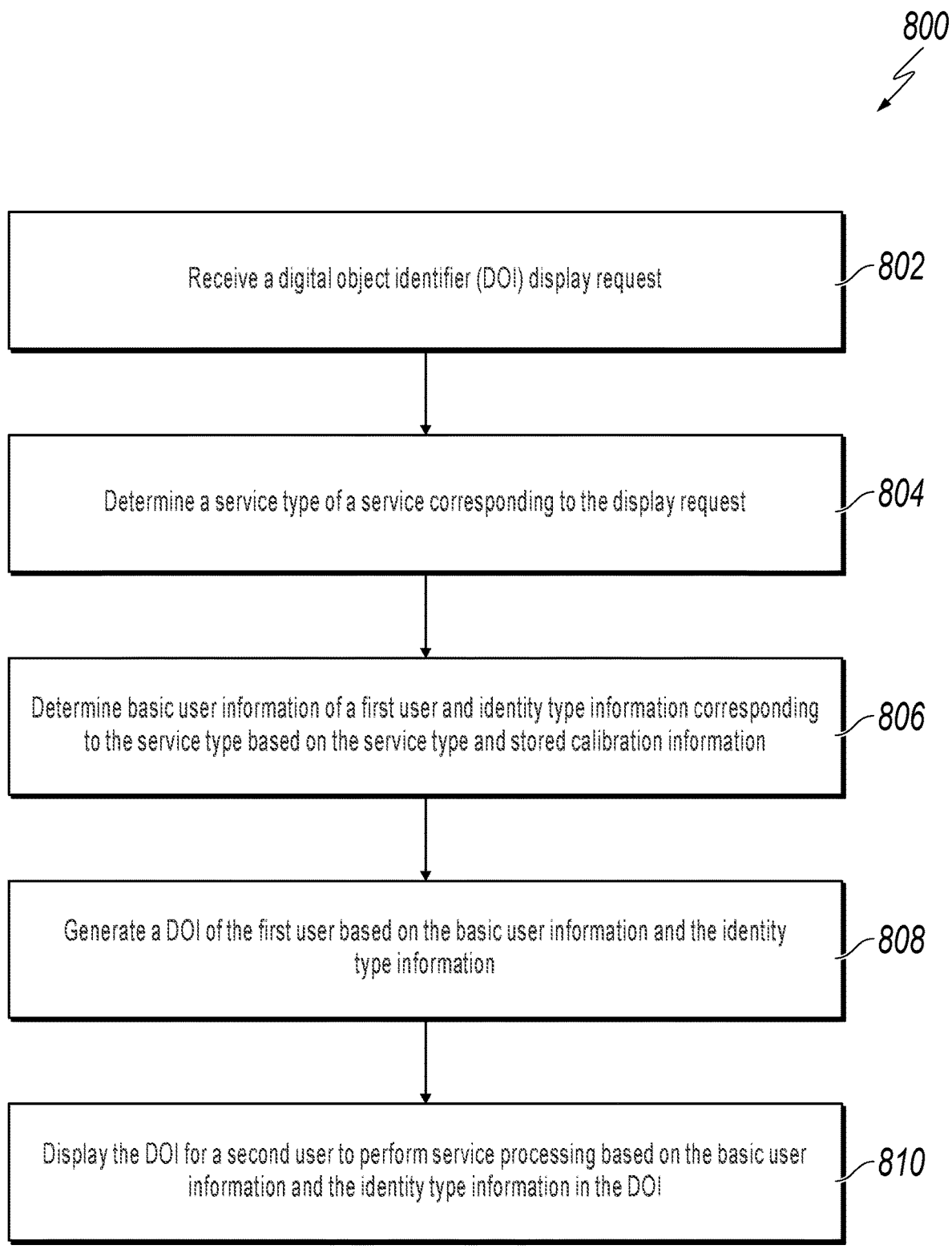
FIG. 8 is a flowchart illustrating an example of a computer-implemented method for processing a service using a DOI, according to an implementation of the present disclosure.

FIG. 8 is a flowchart illustrating an example of a computer-implemented method 800 for processing a service using a DOI, according to an implementation of the present disclosure. For clarity of presentation, the description that follows generally describes method 800 in the context of the other figures in this description. However, it will be understood that method 800 can be performed, for example, by any system, environment, software, and hardware, or a combination of systems, environments, software, and hardware, as appropriate. In some implementations, various steps of method 800 can be run in parallel, in combination, in loops, or in any order.

At 802, a DOI display request is received. From 802, method 800 proceeds to 804.

At 804, a service type of a service corresponding to the display request is determined. From 804, method 800 proceeds to 806.

At 806, basic user information of a first user and identity type information corresponding to the service type is determined based on the service type and stored calibration information, where the identity type information is pre-authenticated to ensure validity based on a validity period associated with the identity type information.

In some implementations, pre-authenticating the identity type information comprises: 1) receiving the identity type information to be authenticated, wherein the identity type information is entered by the first user and 2) sending the identity type information to be authenticated to a server with a verification function for authentication. In some implementations, the identity type information of the first user in the DOI is determined by: 1) parsing the DOI to obtain DOI information; 2) determining information corresponding to a pre-agreed identity type flag bit in the DOI information as obtained information; and 3) determining the obtained information to be the identity type information of the first user. From 806, method 800 proceeds to 808.

At 808, a DOI of the first user is generated based on the basic user information and the identity type information.

In some implementations, generating the DOI of the first user based on the basic user information and the identity type information comprises: 1) setting an information flag bit for the identity type information and 2) generating, based on the basic user information and the identity type information with the information flag bit, the DOI of the first user. From 808, method 800 proceeds to 810.

At 810, the DOI is displayed for a second user to perform service processing based on the basic user information and the identity type information in the DOI.

In some implementations, method 800 can also comprise: 1) checking the identity type information and 2) determining that the identity type information matches the service type of the service. In some implementations, performing service processing comprises: 1) determining, based on a predetermined service processing rule, a service processing method that matches the identity type information and 2) performing, based on the service processing method and the basic user information, service processing. In some implementations, performing service processing comprises: 1) determining, based on the predetermined service processing rule, a payment discount coefficient that matches the identity type information and 2) performing, based on the payment discount coefficient and the basic user information, payment and deduction. After 810, method 800 can stop.

The described methodology describes one or more technical effects and subject matter. In existing technologies, a method for completing a service operation by using a DOI is usually as follows: A first user displays a DOI (for example, a two-dimensional code) of the first user by using a first terminal device, and the DOI stores a user ID of the first user; and a second user can scan the DOI of the first user by using a second terminal device (for example, a code scanning device), and complete corresponding service processing based on the user ID after obtaining the user ID of the first user. The described methodology permits completing a service by using a DOI, different from short-range communications technologies such as Near Field Communication (NFC). Two service parties can exchange information by using the DOI. To ensure validity of the identity type information of the first user, the identity type information is pre-authenticated. The identity type information of the first user is included in the DOI of the first user. Compared with existing technology, especially when information is transmitted by using the DOI, the DOI that includes the identity type information can enable the second user to obtain an identity type of the first user in a unidirectional one-way code scanning transmission process without a need to perform an additional information transmission operation. The described methodology for performing service processing can at least minimize the need for additional computational processing, data transmission, and use of network bandwidth, and can reduce delays in transactions.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for service processing, comprising:
    obtaining a digital object identifier (DOI) of a first user of a first user device, by a second user device, wherein the DOI is generated by the first user device based on basic user information and pre-authenticated identity type information of the first user;
    determining, by the second user device, the basic user information and the identity type information included in the DOI;
    determining that the identity type information matches a service type of a service to be processed; and
    performing, by the second user device, service processing based on the basic user information and the identity type information included in the DOI.

2. The computer-implemented method of claim 1, wherein determining the identity type information included in the DOI comprises:
    parsing the DOI to obtain DOI information;
    determining information corresponding to a pre-agreed identity type flag bit in the DOI information as obtained information; and
    determining the obtained information to be the identity type information of the first user.

3. The computer-implemented method of claim 1, wherein the performing service processing based on the basic user information and the identity type information comprises:
    determining, based on a predetermined service processing rule, a service processing method that matches the identity type information; and
    performing, based on the service processing method and the basic user information, service processing.

4. The computer-implemented method of claim 1, wherein the performing service processing based on the basic user information and the identity type information comprises:
    determining, based on a predetermined service processing rule, a payment discount coefficient that matches the identity type information; and
    performing, based on the payment discount coefficient and the basic user information, payment and deduction.

5. The computer-implemented method of claim 1, further comprising:
    obtaining calibration information, comprising a plurality of different identity types and validity periods of different identity types; and
    checking, based on the calibration information, a validity of the identity type information included in the DOI.

6. The computer-implemented method of claim 1, wherein both the first user device and the second user device are disconnected from a communication network.

7. A non-transitory, computer-readable medium storing one or more instructions executable by a computer system to perform operations for service processing, comprising:
    obtaining a digital object identifier (DOI) of a first user of a first user device, by a second user device, wherein the DOI is generated by the first user device based on basic user information and pre-authenticated identity type information of the first user;
    determining, by the second user device, the basic user information and the identity type information included in the DOI;
    determining that the identity type information matches a service type of a service to be processed; and
    performing, by the second user device, service processing based on the basic user information and the identity type information included in the DOI.

8. The non-transitory, computer-readable medium of claim 7, wherein the determining the identity type information included in the DOI comprises:
    parsing the DOI to obtain DOI information;
    determining information corresponding to a pre-agreed identity type flag bit in the DOI information as obtained information; and
    determining the obtained information to be the identity type information of the first user.

9. The non-transitory, computer-readable medium of claim 7, wherein the performing service processing based on the basic user information and the identity type information comprises:
    determining, based on a predetermined service processing rule, a service processing method that matches the identity type information; and
    performing, based on the service processing method and the basic user information, service processing.

10. The non-transitory, computer-readable medium of claim 7, wherein the performing service processing based on the basic user information and the identity type information comprises:
    determining, based on a predetermined service processing rule, a payment discount coefficient that matches the identity type information; and
    performing, based on the payment discount coefficient and the basic user information, payment and deduction.

11. The non-transitory, computer-readable medium of claim 7, wherein the operations further comprise:
    obtaining calibration information, comprising a plurality of different identity types and validity periods of different identity types; and
    checking, based on the calibration information, a validity of the identity type information included in the DOI.

12. The non-transitory, computer-readable medium of claim 7, wherein both the first user device and the second user device are disconnected from a communication network.

13. A computer-implemented system for service processing, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining a digital object identifier (DOI) of a first user of a first user device, by a second user device, wherein the DOI is generated by the first user device based on basic user information and pre-authenticated identity type information of the first user;
determining, by the second user device, the basic user information and the identity type information included in the DOI;
determining that the identity type information matches a service type of a service to be processed; and
performing, by the second user device, service processing based on the basic user information and the identity type information included in the DOI.

14. The computer-implemented system of claim 13, wherein the determining the identity type information included in the DOI comprises:
parsing the DOI to obtain DOI information;
determining information corresponding to a pre-agreed identity type flag bit in the DOI information as obtained information; and
determining the obtained information to be the identity type information of the first user.

15. The computer-implemented system of claim 13, wherein the performing service processing based on the basic user information and the identity type information comprises:
determining, based on a predetermined service processing rule, a service processing method that matches the identity type information; and
performing, based on the service processing method and the basic user information, service processing.

16. The computer-implemented system of claim 13, wherein the performing service processing based on the basic user information and the identity type information comprises:
determining, based on a predetermined service processing rule, a payment discount coefficient that matches the identity type information; and
performing, based on the payment discount coefficient and the basic user information, payment and deduction.

17. The computer-implemented system of claim 13, wherein the operations further comprise:
obtaining calibration information, comprising a plurality of different identity types and validity periods of different identity types; and
checking, based on the calibration information, a validity of the identity type information included in the DOI.

18. The computer-implemented system of claim 13, wherein both the first user device and the second user device are disconnected from a communication network.

* * * * *

UNITED STATES PATENT AND TRADEMARK OFFICE
CERTIFICATE OF CORRECTION

PATENT NO. : 10,902,233 B2  
APPLICATION NO. : 16/802725  
DATED : January 26, 2021  
INVENTOR(S) : Ge Chen et al.

Page 1 of 1

It is certified that error appears in the above-identified patent and that said Letters Patent is hereby corrected as shown below:

In the Claims

In Claim 1, Column 17, Line 43, after "device," insert -- the --.

In Claim 3, Column 17, Line 56, delete "the performing" and insert -- performing the --, therefor.

In Claim 3, Column 17, Line 63, after "user information," insert -- the --.

In Claim 4, Column 17, Line 65, delete "the performing" and insert -- performing the --, therefor.

In Claim 7, Column 18, Line 30, after "device," insert -- the --.

In Claim 9, Column 18, Line 44, delete "the performing" and insert -- performing the --, therefor.

In Claim 9, Column 18, Line 51, after "user information," insert -- the --.

In Claim 10, Column 18, Line 53, delete "the performing" and insert -- performing the --, therefor.

In Claim 13, Column 19, Line 11, after "perform" delete "one or more".

In Claim 13, Column 19, Line 23, after "device," insert -- the --.

In Claim 15, Column 20, Line 4, delete "the performing" and insert -- performing the --, therefor.

In Claim 15, Column 20, Line 11, after "information," insert -- the --.

In Claim 16, Column 20, Line 13, delete "the performing" and insert -- performing the --, therefor.

Signed and Sealed this  
Eleventh Day of May, 2021

Drew Hirshfeld  
*Performing the Functions and Duties of the  
Under Secretary of Commerce for Intellectual Property and  
Director of the United States Patent and Trademark Office*